United States Patent [19]
Buchsbaum et al.

[11] Patent Number: 6,073,098
[45] Date of Patent: Jun. 6, 2000

[54] METHOD AND APPARATUS FOR GENERATING DETERMINISTIC APPROXIMATE WEIGHTED FINITE-STATE AUTOMATA

[75] Inventors: Adam Louis Buchsbaum, Cranford, N.J.; Raffaele Giancarlo, Battipaglia, Italy; Jeffery Rex Westbrook, East Haven, Conn.

[73] Assignee: AT&T Corporation, New York, N.Y.

[21] Appl. No.: 08/975,648

[22] Filed: Nov. 21, 1997

[51] Int. Cl.[7] .................................................. G10L 15/08
[52] U.S. Cl. .......................................... 704/255; 704/256
[58] Field of Search ...................................... 704/231, 232, 704/236, 242, 255, 256; 706/5, 17, 20, 39, 55

[56] References Cited

U.S. PATENT DOCUMENTS

| | | | |
|---|---|---|---|
| 4,718,092 | 1/1988 | Klovstad | 704/239 |
| 5,787,396 | 7/1998 | Komori et al. | 704/256 |
| 5,794,198 | 8/1998 | Takahashi et al. | 704/256 |

FOREIGN PATENT DOCUMENTS

| | | | |
|---|---|---|---|
| 6-202687 | 7/1994 | Japan | 704/256 |
| 6-266384 | 9/1994 | Japan | 704/256 |
| 2209418 | 5/1989 | United Kingdom | 704/256 |

OTHER PUBLICATIONS

D. Breslauer, The Suffix Tree of a Tree and Minimizing Sequential Transducers; 7th Symposium on Computation Pattern Matching, Feb. 12, 1996, pp. 1–16.

A. Buchsbaum et al., On Reduction via Determinization of Speech–Recognition Lattices, AT&T Labs–Research Technical Report, Jul. 8, 1997, pp. 1–31.

F. Jelinek et al., Principles of Lexical Language Modeling for Speech Recognition, *Advances in Speech Signal Processing*, Marcel Dekker, Inc., 1992; pp. 651–699.

M. Mohri, Minimization of Sequential Transducers, 5th Annual Symposium on Computational Pattern Matching, (published in Lecture Notes on Computer Science 807), 1994, pp. 151–163.

M. Mohri, Finite–State Transducers in Language and Speech Processing, Computational Linguistics, vol. 23, #2, Jun. 1997, pp. 1–42.

(List continued on next page.)

*Primary Examiner*—David R. Hudspeth
*Assistant Examiner*—Martin Lerner
*Attorney, Agent, or Firm*—Oliff & Berridge, PLC

[57] ABSTRACT

An approximate weighted finite-state automaton can be constructed in place of a weighted finite-state automaton so long as the approximate weighted finite-state automaton maintains a sufficient portion of the original best strings in the weighted finite-state automaton and sufficiently few spurious strings are introduced into the approximate weighted finite-state automaton compared to the weighted finite-state automaton. An approximate weighted finite-state automaton can be created from a non-deterministic weighted finite-state automaton during determinization by discarding the requirement that old states be used in place of new states only when an old state is identical to a new state. Instead, in an approximate weighted finite-state automaton, old states will be used in place of new states when each of the remainders of the new state is sufficiently close to the corresponding remainder of the old state. An error tolerance parameter τ defines whether the remainders of the new state are sufficiently close to the corresponding remainders of the old state. If the remainders of the new state are sufficiently close to the remainders of the old state, a new transition is created from a current state to the old state rather than the new state. Such approximate weighted finite-state automata allow the size of the resulting deterministic finite-state automata to be reduced and can prevent the expansion that would otherwise occur in some deterministic finite-state automata.

12 Claims, 12 Drawing Sheets

OTHER PUBLICATIONS

M. Mohri, On some applications of finite–state automata theory to natural language processing, Natural Language Engineering 2(1): 61–80, 1996 Cambridge University Press, pp. 61–80.

F.C.N. Pereira et al., Speech Recognition by Composition of Weighted Finite Automata, *Finite State Language Processing*, MIT Press, 1997, pp. 1–24.

F. Pereira et al., Weighted Rational Transductions and their Application to Human Language Processing, Proc. ARPA Human Language Tech. Wksp., 1994, pp. 249–254.

M. Rabin, Probabilistic Automata, Information and Control 6, 1963, pp. 230–245.

L.R. Rabiner, A Tutorial on Hidden Markov Models and Selected Applications in Speech Recognition, Stochastic Approaches, IEEE, 1989, pp. 267–296.

C. Reutenauer et al., Minimization of Rational Word Functions, SIAM J. Comput. vol. 20, No. 4, Aug. 1991, pp. 669–685.

E. Roche, Smaller Representations for Finite–State Transduceer and Finite–State Automata, 6 Symposium on Comp. Pattern Matching, 1995, (pub. in Lect. Notes on Computer Science 937 (pp. 352–365)).

COMPRESSION VS. TOLERANCE

PRESERVATION OF BEST STRING (MAX N=20)

RECOGNITION PERFORMANCE

FIG. 18

1. INPUT: $A=(Q,\bar{q},\Lambda,\delta,Q_f)$, OVER SEMIRING $(R,\oplus,\otimes,\bar{0},\bar{1})$;
2. INPUT: ERROR TOLERANCE PARAMETER $\varepsilon$;
3. LET $Q' \leftarrow \emptyset$;
4. LET $Q'_f \leftarrow \emptyset$;
5. LET $\delta' \leftarrow \emptyset$;
6. LET $P=\{\{(\bar{q},\bar{1})\}\}$;
7. WHILE $P \neq \emptyset$ DO
8.    REMOVE ANY ELEMENT $q=\{(q1,r1),...(q_n,r_n)\}$ FROM P;
9.    $Q' \leftarrow Q' \cup \{q\}$;
10.    FOR ALL $\sigma \in \Lambda$ DO
11.       LET $\{q'_1,...,q'_m\} \leftarrow \cup_{1 \leq i \leq n}\{q': \exists \nu, (q_i,\sigma,\nu,q') \in \delta\}$;
12.       COMMENT: THESE ARE THE STATES (UP TO MULTIPLICITY) REACHABLE BY $\sigma$-TRANSITIONS OUT OF ALL THE $q_i$;
13.       FOR $1 \leq j \leq m$ LET $p_j \leftarrow \oplus_{1 \leq i \leq n; (q_i,\sigma,\nu,q') \in \delta} (r_i \otimes \nu)$;
14.       LET $p \leftarrow \oplus_{1 \leq j \leq m} P_j$;
15.       LET $p^{-1} \oplus$ BE SUCH THAT $p \oplus p^{-1} = \bar{1}$;
16.       FOR $1 \leq j \leq m$ LET $s_j = p_j \otimes p^{-1}$;
17.       LET $q' \leftarrow \{(q'_1, s_1),...,(q'_m,s_m)\}$
18.       LET $T_1 \leftarrow \{\{(q''_1,x_1),...,(q''_m,i_m)\} \in Q' \cup P \cup \{q\}: q''_j=q'_j, x_j \in R, 1 \leq j \leq m\}$;
19.       COMMENT: $T_1$ IS THE SET OF TUPLES WITH STATES IDENTICAL TO THOSE OF $q'$;
20.       LET $T_2 \leftarrow \{\{(q''_1,x_1),...,(q''_m,x_m)\} \in T : x_j - s_j \leq \varepsilon \cdot \min\{s_j,x_j\}\}$;
21.       IF $T_2 = \emptyset$ THEN
22.          $P \leftarrow P \cup \{q'\}$;
23.          IF $q'_i \in Q_f$ FOR ANY $1 \leq i \leq m$ THEN $Q'_f \leftarrow Q'_f \cup \{q'\}$;
24.          LET $\delta' \leftarrow \delta' \cup \{(q, \sigma, p, q')\}$;
25.       ELSE
26.          PICK $q''$ TO BE ANY ELEMENT OF $T_2$;
27.          LET $\delta' \leftarrow \delta' \cup \{(q, \sigma, p, q'')\}$;
28.       END IF;
29.    END FOR;
30. END WHILE;
31. OUTPUT: $A' = (Q', (\bar{q}, \bar{1}), \Lambda, \delta', Q'_f)$.

METHOD AND APPARATUS FOR GENERATING DETERMINISTIC APPROXIMATE WEIGHTED FINITE-STATE AUTOMATA

BACKGROUND OF THE INVENTION

1. Field of Invention

This invention relates generally to automatic speech recognition. In particular, this invention relates to determinizing non-deterministic weighted finite-state automata used in automatic speech recognition. More specifically, this invention relates to generating approximate weighted finite-state automata from non-deterministic weighted finite-state automata.

2. Description of Related Art

One of the central problems in automatic speech recognition (ASR) is to reduce the sizes of the lattices that represent hypotheses of spoken utterances. As shown in FIG. 1, automatic speech recognition can be viewed as a processing pipeline or cascade. In each step of the processing cascade, one or two lattices are input and composed to produce an output lattice. In automatic speech recognition, the term "lattice" denotes a directed and labeled graph, which is possibly weighted. In each lattice, there is typically a designated start node "s" and a designated final node "t". Each possible pathway through the lattice from the start node s to the final node t induces a hypothesis based on the arc labels between each pair of nodes in the path. For example, in a word lattice, the arc labels are words and the various paths between the start node s and the final node t form sentences.

As shown in FIG. 1, an automatic speech recognition system 100 includes a signal processing system 110, an acoustic model lattice 120, a phonetic recognition subsystem 130, a lexicon lattice 140, a word recognition subsystem 150, a grammar lattice 160, and a task recognition subsystem 170. In operation, uttered speech is input via a microphone (not shown) which converts the sound waves of the uttered speech into an electronic speech signal. The electronic speech signal is input to the signal processing system on a speech signal input line 105. The signal processing subsystem 110 digitizes the electronic speech signal to generate a feature vector lattice 115. The feature vector lattice 115 is a lattice of acoustic feature vectors. The feature vector lattice 115 is input along with the acoustic model lattice 120 to the phonetic recognition subsystem 130. The acoustic model lattice 120 represents a set of acoustic models and is applied to transform the feature vector lattice 115 into a phone lattice. Each node of the phone lattice represents a spoken sound, such as, for example, the vowel /e/ in "bed".

The phone lattice 135 is input along with the lexicon lattice 140 into the word recognition subsystem 150. The lexicon lattice 140 describes different pronunciations of various words and transforms the phone lattice 135 into a word lattice 155. The word lattice 155 is then input, along with the grammar lattice 160, into the task recognition subsystem 170. The grammar lattice 160 represents task-specific information and is used to extract the most likely sequence of words from the word lattice 155. Thus, the task recognition subsystem 170 uses the grammar lattice 160 to extract the most likely sentence from the word lattice 155. The most likely sequence is output as the recognized text 175.

In particular, one conventional method of implementing automatic speech recognition forms each of the acoustic model lattice 120, the lexicon lattice 140 and the grammar lattice 160 as a finite-state transducer. Thus, each of the phonetic recognition subsystem 130, the word recognition subsystem 150, and the task recognition 170 performs a generalized composition operation between its input finite-state transducers. In addition, the signal processing subsystem 110 outputs the features vector lattice 115 as a finite-state transducer.

FIGS. 2A–2C show more generalized forms of the automatic speech recognition transduction cascade. In particular, in automatic speech recognition, the finite-state transducers are weighted finite-state automata, which represent and compute membership information on weighted languages such as, for example, sets of words or sentences. In particular, the size of a weighted finite-state automata is critical to automatic speech recognition. Conventionally, analogs to classical automata determinization and minimization are used to reduce weighted finite-state automata size. However, not all weighted finite-state automata can be determinized. Furthermore, for those that can be determinized, the equivalent deterministic weighted finite-state automaton can be exponentially larger. The nature of automatic speech recognition, however, appears to constrain the weighted finite-state automata so that determinization is not only possible, but often produces a deterministic weighted finite-state automaton that is smaller than the equivalent non-deterministic weighted finite-state automaton.

One method for determinizing and minimizing non-deterministic weighted finite-state automata is described in "Finite-State Transducers in Language and Speech Processing", M. Mohri, *Computational Linguistics* 23, 1997 (Mohri), herein incorporated by reference in its entirety. This method for determinizing and minimizing non-deterministic weighted finite-state automata generates significant average size reductions for the equivalent deterministic weighted finite-state automata. However, this method does not reduce all non-deterministic weighted finite-state automata, presenting a problem for real-time automatic speech recognition.

SUMMARY OF THE INVENTION

This invention provides a method and apparatus that generates deterministic weighted finite-state automata having improved size reductions.

This invention further provides a method and apparatus which is capable of generating reduced deterministic weighted finite-state automata which cannot be reduced using current techniques.

This invention also provides a method and apparatus which generate approximate weighted finite-state automata.

This invention additionally provides a method and apparatus for performing automatic speech recognition using the approximate weighted finite-state automata.

Approximate weighted finite-state automata are devices that represent and compute membership information on weighted languages, for example, sets of words or sentences. Approximate weighted finite-state automata are approximate in that the language represented by the approximate weighted finite-state automata can differ from the language represented by the weighted finite-state automata from which it is generated. Approximate weighted finite-state automata can be used to represent approximations to various automatic speech recognition models. The approximate weighted finite-state automata require less space, i.e., computer memory, than the corresponding finite-state automata from which they are generated. At the same time, the approximations used to generate the approximate weighted finite-state automata do not degrade the accuracy or precision of the automatic speech recognition process.

It should also be appreciated that other paradigms for the automatic speech recognition process benefit from the size reduction due to finite-state automata determinization and minimization. These other automatic speech recognition paradigms include using hidden Markov models and n-gram language models to implement the various stages of the automatic speech recognition process. Thus, the approximate weighted finite-state automata will also be applicable to these models. In short, any bounded memory stochastic representation can be implemented using a weighted finite-state automaton, which can in turn be approximated with the approximate weighted finite-state automaton of this invention.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 18 is a listing of an exemplary program implementing the flowcharts of FIGS. 12 and 13.

DETAILED DESCRIPTION OF PREFERRED EMBODIMENTS

Figure 1:
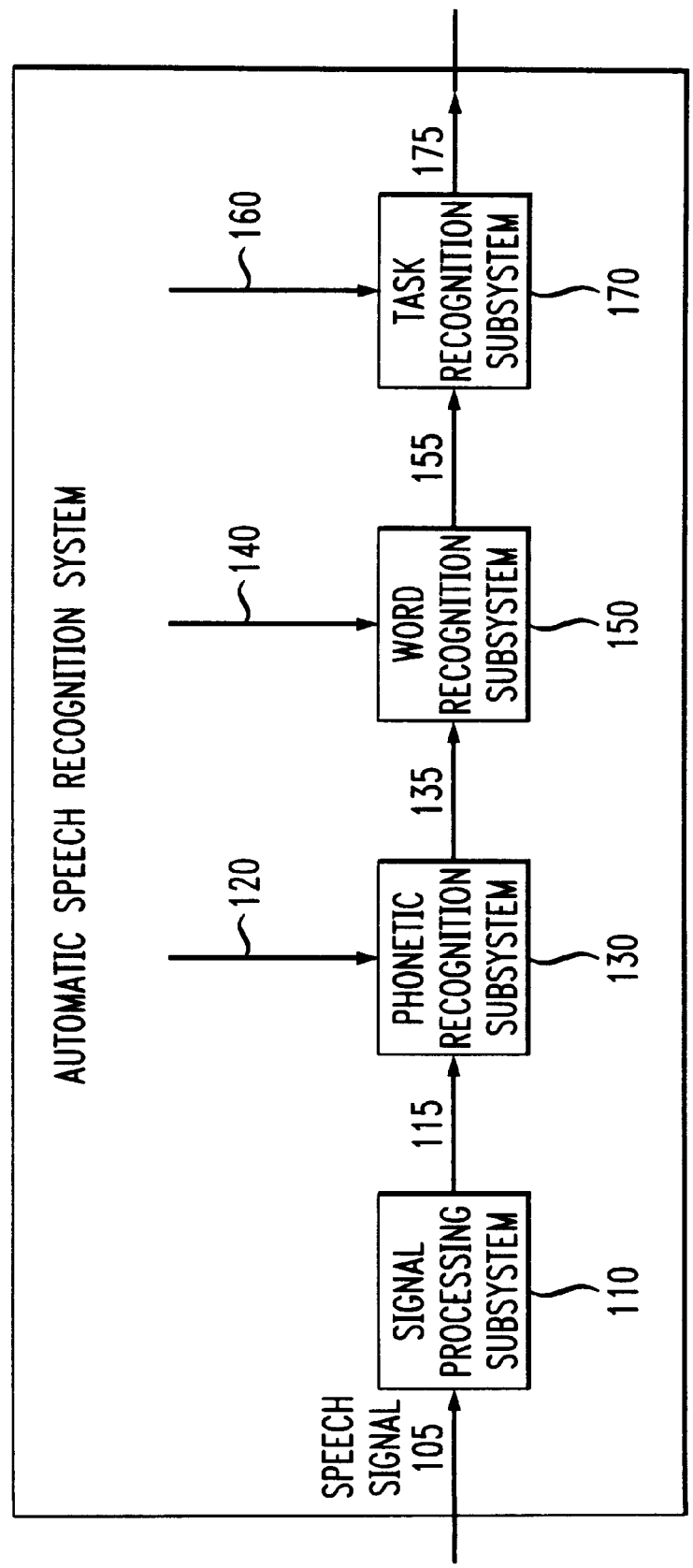
FIG. 1 is a block diagram of a conventional automatic speech recognition system.

A weighted finite-state automaton "G" is a tuple:

$$G=(Q,q_0,\Lambda,\delta,Q_f)$$

where:

Q is the set of states;

$q_0$ is the initial state;

$\Lambda$ is the set of labels, i.e., the set of strings over some finite alphabet $\Sigma$;

$\delta$ is the set of transitions t; and $Q_f$ is the set of final states.

Each transition t that is a member of $\delta$ is a quadruple of the form $(q_1, \lambda, \rho, q_2)$. In particular, when the weighted finite-state automaton is in the state $q_1$ and it receives the input $\lambda$, where $\lambda$ is a member of the set of labels $\Lambda$, the weighted finite-state automaton moves to the state $q_2$, while assigning the weight $\rho$ to the input $\lambda$.

If the weighted finite-state automaton is non-deterministic, there is at least one additional transition t' of the form $(q_1, \lambda, \rho', q_2')$. That is, in a non-deterministic weighted finite-state automaton, when it is in state $q_1$ and receives the input $\lambda$, the weighted finite-state automaton can move to both $q_2$ and $q_2'$. If the weighted finite-state automaton has no such transitions t', it is deterministic. That is, given any state $q_1$ and any of the acceptable inputs at state $q_1$, the weighted finite-state automaton moves to exactly one state $q_2$.

In general, a weighted finite-state automaton will have a single final state $q_f$. A string w, where each of the elements $\lambda$ of w is a member of the set of labels $\Lambda$, is accepted by the weighted finite-state automaton G if there is a sequence of transitions t from the start state $q_0$ to the final state $q_f$.

In general, for performance reasons, when the lattices used in automatic speech recognition are implemented using weighted finite-state automata, the weighted finite-state automata should be deterministic. Thus, any non-deterministic weighted finite-state automaton typically is determinized. A non-deterministic weighted finite-state automaton G is determinized by generating a deterministic weighted finite-state automaton G' such that for any state q' of G', there is only one transition out of q' that can be taken with a given input symbol, and that G' accepts the same set of strings with the same weights as G.

One type of weighted finite-state automata used in automatic speech recognition is weighted string-to-string transducers (WSSTs), which transforms strings in one language to strings in another. In traditional automatic speech recognition, acoustic observations O of uttered speech are first transformed into the lattice of feature vectors 115. A lattice is a weighted finite-state automaton or WSST having a single final state. The feature vector lattice 115 is then transformed into the phone lattice 135. The phone lattice 135 captures the fact that more than one phone sequence can correspond to the observed speech. The phone lattice 135 also assigns a probability to each such sequence. The phone lattice 135 is then transformed into the word lattice 155, which captures the analogous ambiguities with respect to word sequences. The sentence most likely spoken is extracted from the word lattice 155 using the language model or grammar lattice 160, which stochastically describes possible sequences of words.

Figure 2A:
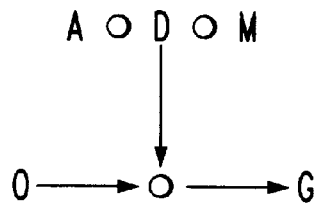
FIGS. 2A–2C outline in more general terms the automatic speech recognition process.
Figure 2B:
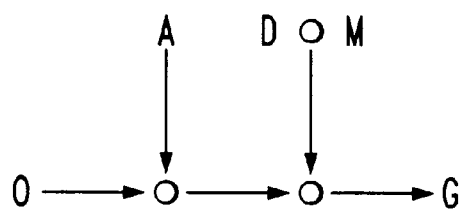
Figure 2C:
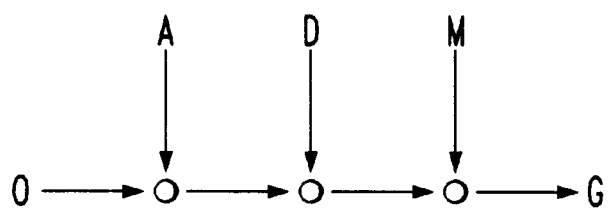

In particular, as shown in FIGS. 2A–2C, the acoustic observations form a weighted finite-state automaton "O". A set of acoustic models "A" forms a WSST. The composition "O°A" produces the phone lattice 135. A lexicon "D" is a WSST that maps phones to words. Thus, the composition "(O°A)°D" produces the word lattice 155. Finally, the language model or grammar "M" is a weighted finite-state automaton that defines the automatic speech recognition task by restricting the types of expected sentences. Thus, the finite-state automaton G is the composition "((O°A)°D)°M". The weighted finite-state automaton G describes the automatic speech recognition results. In automatic speech recognition, the transition weights are negated log probabilities, so the shortest path through G corresponds to the most likely uttered sentence. The A, D and M lattices are derived from a combination of human engineering and automated stochastic inference and can be highly non-deterministic.

Since composition is associative, the above-outlined compositions can be computed in the most efficient order. In addition, the most efficient order will vary with the automatic speech recognition task to be performed. Since, for any two weighted finite-state automata $X_1$ and $X_2$, $|X_1°X_2| = \Omega(|X_1|\cdot|X_2|)$, the efficiency of composition depends critically on the size of the weighted finite-state automata. Furthermore, weighted finite-state automata size affects memory usage. This determines whether the composition "(A°D)°M" can be computed and stored in main memory so that the automated speech recognition system can be run as a single process, as shown in FIG. 2A or whether one or more intermediate compositions must be precomputed and stored on disk, as shown in FIGS. 2B and 2C.

Determinizing a weighted finite-state automaton G requires generating a deterministic weighted finite-state automaton G' such that the language L' of G' is the same as the language L of G. The language L of a weighted finite-state automaton G is the set of weighted strings accepted by that automaton G. Thus, the deterministic weighted finite-state automaton G' must accept the same strings with the same weights as the weighted finite-state automaton G. Mohri, supra, outlines a method for generating a deterministic weighted finite-state automaton G' from a non-deterministic weighted finite-state automaton G.

A weighted finite-state automaton G expands if the deterministic weighted finite-state automaton G' generated by determinizing G has more states and/or more transitions than G. Numerous examples are known in the art of classical non-deterministic finite-state automata for which the corresponding minimal deterministic automata are exponentially larger. Intuitively, such non-deterministic finite-state automata accept languages with some "essential" non-determinism. That is, the non-deterministic finite-state automata make choices early that the corresponding deterministic finite-state automata cannot resolve before processing the entire input. Since any non-deterministic finite-state automaton corresponds to a weighted finite-state automaton with all weights set to zero, these examples give instances of weighted finite-state automata that expand regardless of the weights.

Conventionally, it was understood that automatic speech recognition lattices, on the other hand, tended to manifest a topology that never expands under determinization. Those skilled in the art had previously suggested that the topologies particular to automatic speech recognition lattices, in particular acyclic, multi-partite graphs, cause determinization to perform well and that the weights do not matter. However, the classical weighted finite-state automata described above that always expand when determinized also manifest these properties. Thus, the inventors of the invention described herein believe that there is no convincing reason why automatic speech recognition lattices should be solely dependent on the lattice topology. Rather, as outlined below, the method and apparatus of this invention rely on the discovery that automatic speech recognition lattices in particular, and many classes of weighted finite-state automata in general, expand or contract solely as a function of the weights supplied to the transitions. That is, the inventors have discovered a class of weighted finite-state automata whose expansion/contraction during determinization is purely weight-dependent.

Figure 3:
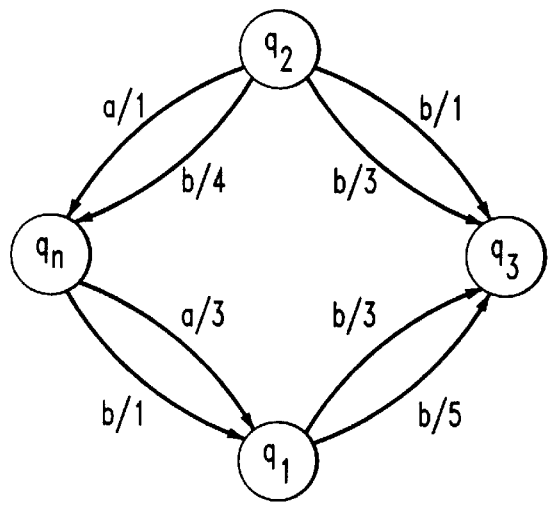
FIG. 3 is an exemplary non-deterministic weighted finite-state automaton.

FIG. 3 shows a non-deterministic weighted finite-state automaton G. As shown in FIG. 3, G has four states, a start state $q_0$, two intermediate states $q_1$ and $q_2$, and a final state $q_3$. In particular, given an input "a" received at the start state $q_0$, the automaton G can move from the start state $q_0$ to the intermediate state $q_1$ with weight 3 or to the intermediate state $q_2$ with weight 1. Similarly, if an input "b" is received at the start state $q_0$, the automaton G will move from the start state $q_0$ to the intermediate state $q_1$ with weight 1 or to the intermediate state $q_2$ with weight 4. Similarly, at the intermediate state $q_1$, when the input "b" is received, the automaton G will move from the intermediate state $q_1$ to the final state $q_3$ with a weight of either 3 or 5. Likewise, at the intermediate state $q_2$, when the input "b" is received, the automaton G will move from the intermediate state $q_2$ to the final state $q_3$ with a weight of either 1 or 3. Thus, the weighted finite-state automaton G is non-deterministic, because at at least one state, and in this case, at states $q_0$, $q_1$, and $q_2$, for a given input, there is more than one path which can be taken from that state to either different states or on different paths to the same state.

Figure 4:
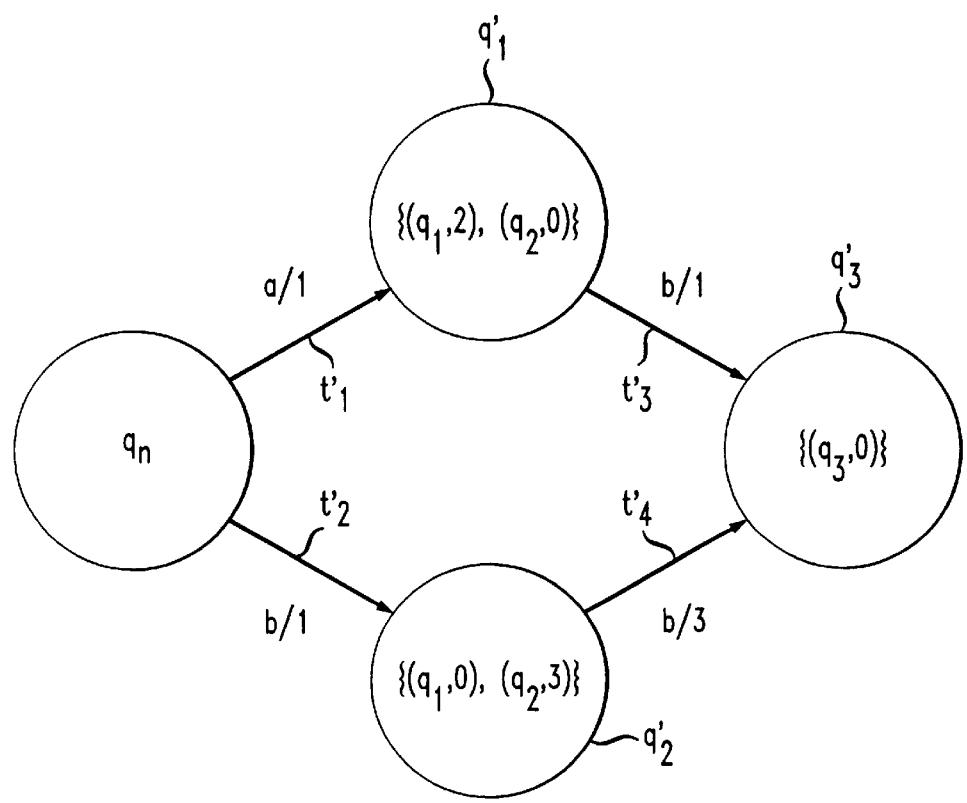
FIG. 4 is a deterministic weighted finite-state automaton generated from the non-deterministic weighted finite-state automaton FIG. 3.

The determinization method outlined in Mohri generates the deterministic weighted finite-state automaton G' shown in FIG. 4. First, the start state $q_0$ of G is pushed onto a stack queue P. While the queue P is not empty, the top state of the queue P is popped from the queue P. From the initial state $q_0$, the state $q_1$ and $q_2$ can be reached using the input symbol "a". Thus, a new state $q_1'=[q_1,q_2]$ reachable from the current state $q_0$ with the input symbol "a" is established with a new transition $t_1'=[q_0,a,\rho,q_1']$. The weight $\rho$ for the new transition $t_1'$ is the minimum weight of the transitions labeled "a" from the current state to $q_0$ to either of the reachable states $q_1$ or $q_2$, plus any remainder that may be assigned to a corresponding substate of the current state. Because the current state is the start state $q_0$, there is no remainder. Similarly, because the current state is the start state $q_0$, there are no substates of the current state.

As shown in FIG. 3, the transition labeled "a" from $q_0$ to $q_2$ has the minimum weight, 1. Thus, the weight $\rho$ for the transition $t_1'$ is 1. Because the weight assigned to the new transition $t_1'$ does not capture the full weight of the other a-labeled transition from the current state $q_0$ to the intermediate state $q_1$, each of the substates $q_1$ and $q_2$ of the new state $q_1'$ are assigned remainders. In particular, the remainder for the substate $q_1$ is 2, while the remainder for the substate $q_2$ is zero. Thus, the new state $q_1'$ is rewritten as $[(q_1,2),(q_2,0)]$. This is shown in FIG. 4, which indicates the new transition $t_1'$ and the new state $q_1'$. Similarly, from the current state to $q_0$ in the original non-deterministic weighted finite-state automaton shown in FIG. 3, states $q_1$ and $q_2$ can also be reached from the current state $q_0$ using the input symbol "b". Another new state $q_2'$ is formed, and a new transition $t_2'$ is formed from the current $q_0$ to the new state $q_2'$. The new transition $t_2'$ is again assigned a weight which is equal to the minimum weight of the b-labeled transitions from the current state $q_0$ to the substates of the new state $q_2'$. Likewise, each of the substates of the new state $q_2'$ are assigned remainder weights. This is also shown in FIG. 4.

Because each of the new states $q_1'$ and $q_2'$ is not identical to any other previously determinized, or old, state, each of the new states $q_1'$ and $q_2'$ are added to the queue P. Because all of the transitions from the current state $q_0$ have now been analyzed and determinized, a new state $q_1'$ is popped from the queue P. In particular, the current state $q_1'$ has two substates $q_1$ and $q_2$. Each of these substates $q_1$ and $q_2$ in the original non-deterministic weighted finite-state automaton shown in FIG. 3 has multiple exiting transitions, but each such transition is labeled with the same label "b". Furthermore, each of these transitions moves to the final state $q_3$. Thus, in the non-deterministic weighted finite-state automaton shown in FIG. 3, the final state $q_3$ can be reached from both the substates $q_1$ and $q_2$ of the current state $q_1'$ using the input symbol "b". In addition, there are two such b-labeled transitions from each of the substates $q_1$ and $q_2$. For each such original transition, a first transition weight $\rho_t$ is determined as the sum of the weight assigned to that transition and the remainder associated with the original substate encoded in the current state $q_1'$. In the exemplary non-deterministic weighted finite-state automaton shown in FIG. 3, the four b-labeled transitions have weights of 1, 3, 3, and 5, respectively. Because the $q_1$ substate carries a remainder of 2, while the $q_2$ substate carries the remainder of 0, the transition weights $\rho_t$ for these transitions are 1, 3, 5, and 7, respectively.

In particular, the minimum transition weight $\rho_s$ for the substate $q_1$ is 5, while the minimum transition weight $\rho_s$ for the substate $q_2$ is 1. Thus, the minimum transition weight $\rho_r$ for the reachable state $q_3$ is 1. Since there is only one reachable state for the input table "b" for the current state $q'_1$, the minimum weight $\rho$ for the b-labeled transition for the current state $q'_1$ is 1.

The minimum transition weight $\rho$ is then used as the weight for a new transition $t_3'$ from the current state $q_1'$ to the reachable state $q_3$. In addition, because there is only one reachable state, the final state $q_3$, reachable in the original non-deterministic weighted finite-state automaton shown in FIG. 3 from the current state $q'_1$, there is no new remainder. Thus, the new state established from the current state $q_1'$ reachable using the input symbol b is $q_3'=[q_3]$. This new state is assigned a remainder of zero, resulting in the complete new state $q_3'=[(q_3,0)]$. This is shown in FIG. 4. Using the same procedure, a transition $t_4'$ from the state $q_2'$ to the state $q_3'$ can be formed having a weight of 3. The end result is thus shown in FIG. 4.

Figure 5:
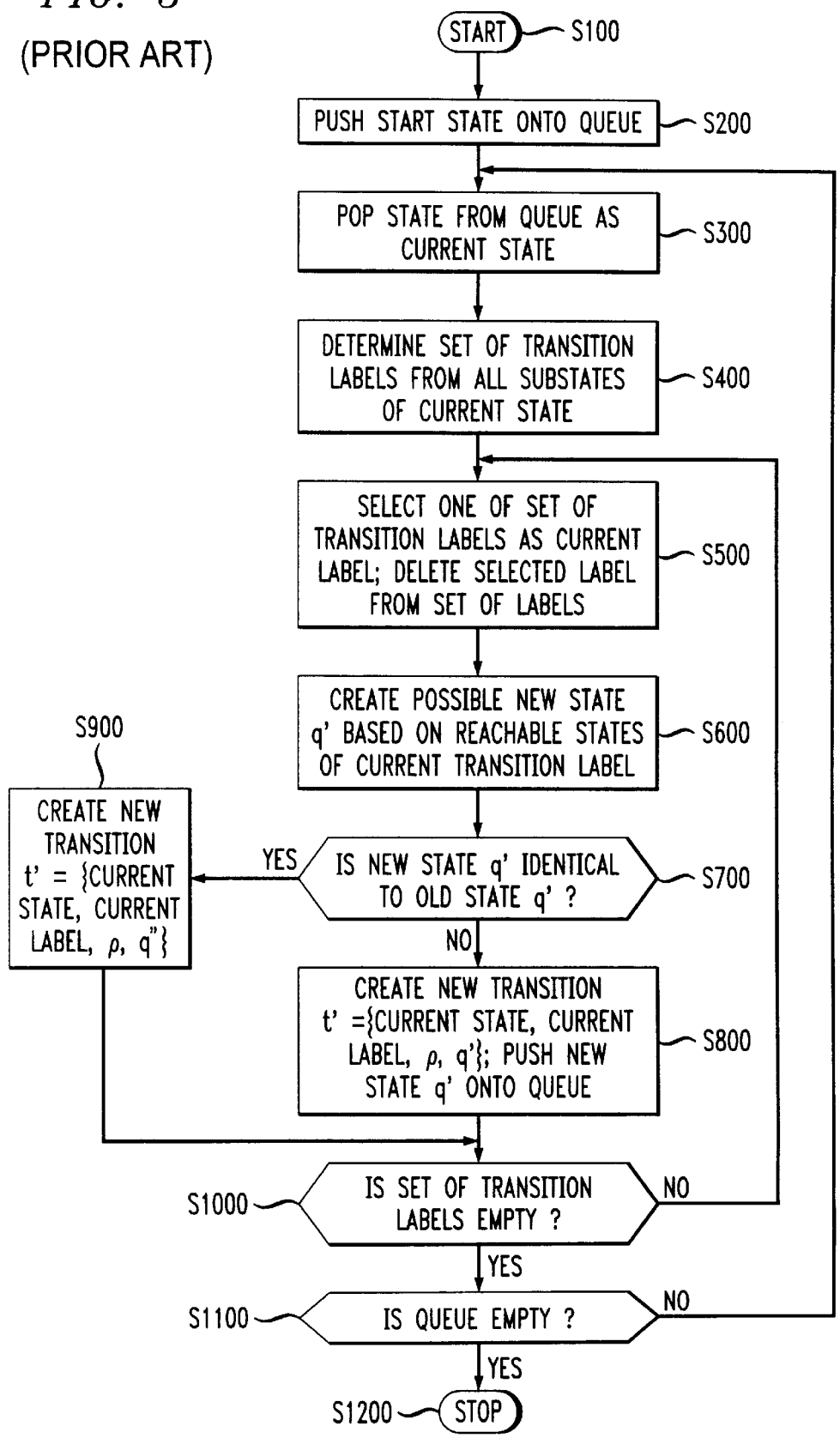
FIG. 5 is a flowchart outlining the method for determinizing a non-deterministic weighted finite-state automaton.

FIG. 5 is a flowchart outlining this process in greater detail. In particular, starting from step S100, control continues to step S200. In step S200, the start state is pushed on top of the queue. Then, in step S300, the top state on the queue is popped as the current state. Next, in state S400, the set of transition labels of all transitions from all substates of the current state is determined. For example, when the current state is state $q_0$ of FIG. 3, the set of transition labels is "a, b". Similarly, when the current state is $q_1'$, the set of transition labels is "b". Control then continues to step S500.

In step S500, one of the set of transition labels is selected as the current label. The selected labeled is then deleted from the set of transition labels. Next, in step S600, a new possible state $q_i'$ is created based on the reachable states reachable from all of the substates of the current state based on the current transition label. Thus, when $q_0$ is the current state and "a" is the current transition label, the new possible state $q_1'$ includes the substates $q_1$ and $q_2$. Similarly, when the current state is the state $q_1'$, the new state $q_3'$ includes only the final state $q_3$. In addition, as set forth in greater detail in the flowchart of FIG. 6, creating the new possible state $q_i'$ includes generating a new transition $t_1'$ from the current state to the new state, determining the weight of that transition and determining the remainders associated with each of the substates of the possible new state $q_i'$. Control then continues to step S700.

In step S700, the control routine determines whether the new possible state $q_i'$ is identical to some previously determinized, or old, state q" in the determinized weighted finite-state automaton being created. That is, in step S700, the control routine determines whether the new state $q_i'$ is the same state as some old state q". To be the same state, both the substates of the new state $q_i'$ must be identical to the substates of the old state q" and the remainders on each of the substates must be same as the remainders on each of the corresponding substates of the old state q". If the new state $q_i'$ is identical to some old state q", control jumps to step S900. Otherwise, control continues to step S800.

In step S800, because the new state $q_i'$ is not identical to any old state q", the new transition $t_i'$ connects the current state to the new state $q_i'$ on the current label with the weight $\rho$ determined in step S600. Then, the new state $q_i'$ is pushed onto the queue. Control then jumps to step S1000. In contrast, if the new state $q_i'$ is identical to some old state q", in step S900, the new transition $t_1'$ connects the current state to the old state q" on the current label with the determined weight $\rho$. Control then continues to step S1000.

In step S1000, the control routine determines if the set of transition labels is empty. If the set of transitions is empty, then all of the transitions from all of the substates of the current state have been determinized and no further analysis of the current state is necessary. Thus, if the set of condition labels is not empty, control returns to step S500, where a next one of the set of transition labels is selected as the current label. Otherwise, if the set of transition labels is empty, no further analysis of the current state is necessary and control continues to step S1100. In step S1100, the control routine determines if the queue is empty. If the queue is not empty, at least one more state needs to be determinized. Thus, control returns to step S300, where the top state from the queue is popped as the current state. Otherwise, if the queue is empty, the non-deterministic weighted finite-state automaton has been fully determinized and control continues to step S1200. In step S1200, the determinization routine stops.

Figure 6:
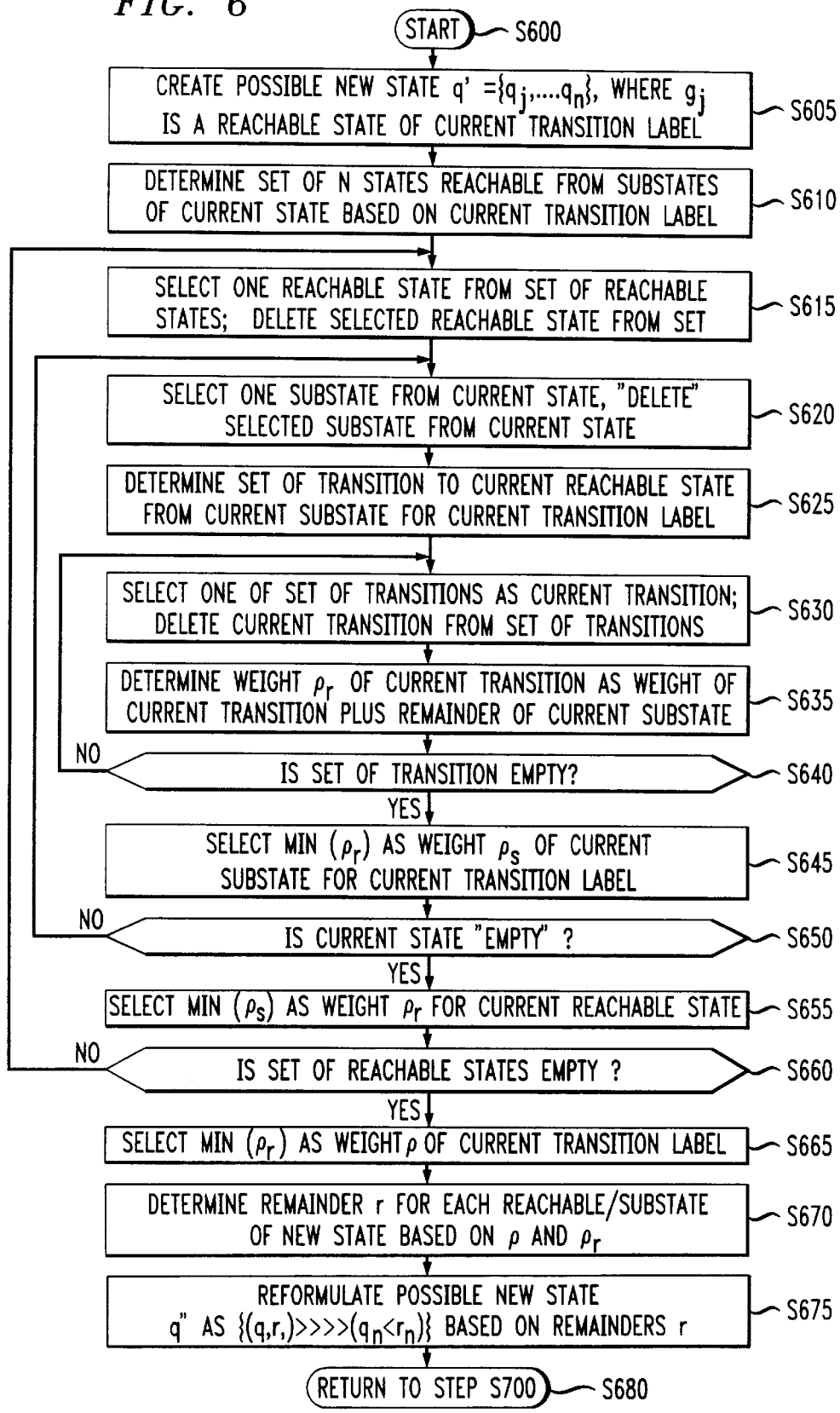
FIG. 6 is a flowchart outlining in greater detail the new state creating step of FIG. 5.

As indicated above, FIG. 6 is a flowchart outlining in greater detail the process of creating a possible new state of step S600. Starting at step S600, control continues to step S605. In step S605, a possible new state $q_i'$ is formed having the form "$q_j, \ldots, q_n$", where each substate $q_j$ is one of the reachable states from all of the substates, if any, of the current state using the current transition label. Then, in step S610, a set of the N states reachable from the substates of the current state based on the current transition label is formed as a control device. This set is identical to the substates $q_j$ of the possible new state and is used to control flow through the process of creating the new possible state $q_i'$. Next, in step S615, one of the reachable states is selected from the set of reachable states. The selected reachable state is then deleted from the set of reachable states. Control then continues to step S620.

In step S620, one substate from a set of substates of the current state is selected. The selected substate is then marked as selected or "deleted" from the current state to indicate it has been analyzed. It should be appreciated that step S620 is analogous to the combination of steps S610 and S615. Thus, steps S610 and S615 could be combined into a single step corresponding to step S620 or step S620 could be divided into two steps corresponding to steps S610 and S615.

Next, in step S625, a set of transitions to the current reachable state from the current substate for the current transition label is determined. Next, in step S630, one of the set of transitions is selected as a current transition. The selected transition is then deleted from the set of current transitions. Control then continues to step S635.

In step S635, the weight $\rho_T$ of the current transition is determined as the weight of the current transition plus the remainder of the current substate. Then, in step S640, the control routine determines if the set of transitions is empty. If not, control returns to step S630, where another one of the set of transitions is selected as the current transition. Otherwise, if the set of transitions is empty, control continues from step S640 to step S645.

In step S645, the minimum $\rho_T$ of the set of transitions from the current substate to the current reachable state for the current transition label is selected as the weight $\rho_S$ of the current substate for the current transition label. Then, in step S650, the control routine determines if all of the substates of the current state has been selected, i.e., if the current state is "empty". If not, control returns to step S620, where the next one of the substates of the current state is selected as the current substate. Otherwise, if the current state is "empty", control continues to step S655.

In step S655, the minimum one of the weights $\rho_S$ of the substates of the current state is selected as the weight $\rho_r$ for the current reachable state for the current transition label. Then, in step S660, the control routine determines if the set of reachable states is empty. If not, control returns to step S615, where a next one of the set of reachable states is selected as the current reachable state. Otherwise, if the set of reachable states is empty, control continues to step S665.

In S665, the minimum one of the weights $\rho_r$ for the reachable states reachable based on the current transition label is selected as the weight $\rho$ of the current transition label. Then, in step S670, a remainder "r" is determined for each reachable state of the new state $q_i'$ reachable based on the current transition label. In particular, the remainder r is determined as:

$$r_j = \rho_j - \rho,$$

where:

$r_j$ is the remainder for the jth reachable state reachable from the current state on the current transition label;

$\rho$ is the minimum weight for the current transition label as determined in step S655; and $\rho_j$ is the weight $\rho_r$ for the jth reachable state.

Then, in step S675, the possible new state $q_i'$ reformatted to associate the jth remainder $\rho_j$ with the corresponding jth reachable states $q_j$. In particular, the possible new state $q_i'$ becomes:

$$q_i' = [(q_j, r_j), \ldots, (q_n, r_n)].$$

Control then continues to step S680 where control is returned to step S700 of the flowchart shown in FIG. 5.

As outlined above, the determinization method outlined in FIGS. 5 and 6 generally causes automatic speech recognition lattices to contract. However, this method is still not able to determinize all non-deterministic weighted finite-state automata nor is it guaranteed to sufficiently reduce the acoustic model lattice "A", the lexicon lattice "D", or the language model lattice "M" so that the full composition of these lattices shown in FIG. 2A can fit in a normally-sized main memory or to allow automatic speech recognition to occur in real time. Furthermore, as described above, the same types of lattices found in automatic speech recognition were conventionally understood to always expand under determinization.

To resolve these conflicts, the inventors of the system and method of this invention analyzed approximately 100 word lattices to determine whether automatic speech recognition lattices are weight-dependent rather than topology-dependent, as was conventionally believed. The 100 word lattices were generated by the AT&T North American Business Speech Recognizer, as described in the "AT&T 60,000 Word Speech-to-Text System", M. D. Riley et al., Proc. 4$^{th}$ EUROSPEECH., vol. 1, pp. 207–210, herein incorporated by reference in its entirety. The word lattices were also generated using a gramnar for the Air Travel Information System (ATIS), a standard 5000-word vocabulary DARPA test bed, as described in "The 1994 AT&T ATIS CHRONUS Recognizer", E. Bocchieri et al., Proc. ARPA SLT, pp. 265–268, herein incorporated by reference in its entirety.

Each of the 100 lattices is a weighted finite-state automaton G of the form:

$$G = ((O \circ A) \circ D) \circ M,$$

as shown in FIG. 2A. Each lattice had been previously weighted by the automatic speech recognition software. These weights are referred to as the "speech weights". For each lattice, the weights were varied but the topology was not changed. Each lattice was determinized with its speech weights, with all weights set to zero, and with weights assigned independently and uniformly at random over eight interval ranges, where the weight within each range was between 0 and $2^i-1$, where i was between 1 and 8. Of the 100 word lattices, one lattice could not be determinized with speech weights due to computational limitations and is thus omitted from the data outlined in FIGS. 7–11. The experiments were run on a Silicon Graphics SGI R4400 processor with 1 gigabyte of main memory and a Silicon Graphics SGI R1000 processor with 1.5 gigabytes of main memory.

Figure 7:
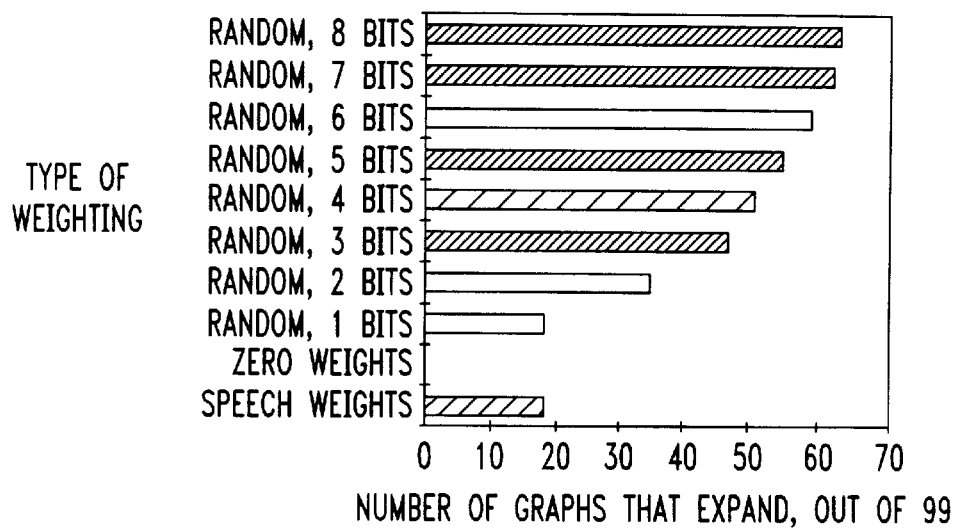
FIG. 7 is a graph plotting the number of weighted finite-state automata that expand during determinization based on the weighting applied to the automata.

FIG. 7 shows how many of the 99 determinizable lattices expanded when determinized for each of the different weightings. As shown in FIG. 7, 18 of the 99 lattices determinizable lattices expanded under speech weights, while none of the determinizable lattices expanded when all the weights were set to zero. Furthermore, 18 of the 99 lattices expanded under the 1 bit random weighting and this increased along a generally decaying exponential curve to a maximum of 63 lattices that expanded under 8-bit random weighting.

Figure 8:
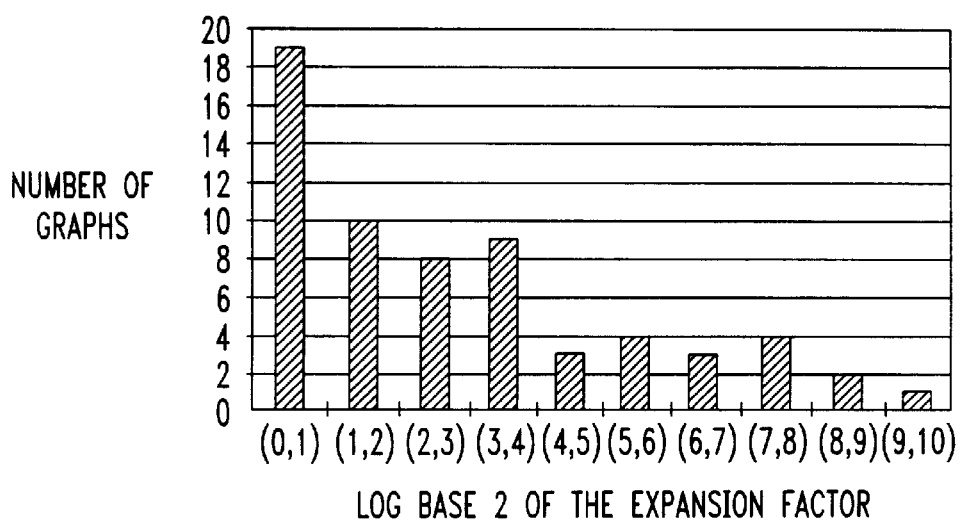
FIG. 8 is histogram of the orders of magnitude of expansion of the weighted finite-state automata that expand during determinization.

FIG. 8 considers the random weighting interval that generated the maximum expansion. This was usually the 8-bit random weighting, although due to computational limitations, some lattices with larger random weightings could not be determinized. The value of the x-axis indicates the open interval within the logarithm of the expansion ratio, i.e., the ratio of the size of the determinized lattice to the size of the undeterminized lattice falls.

Figure 9:
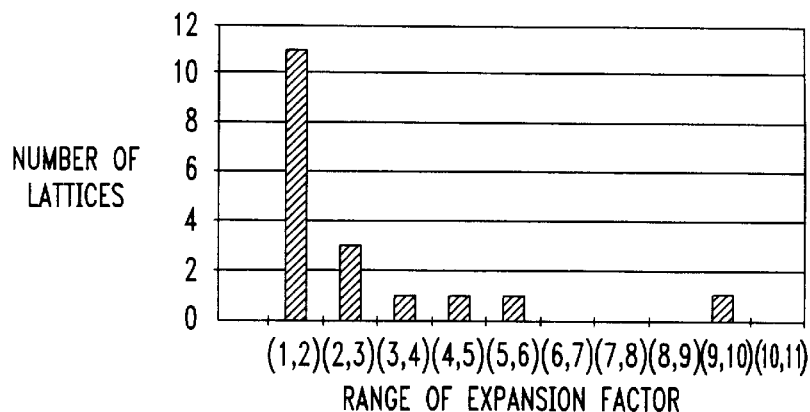
FIG. 9 is a histogram of the orders of magnitude of expansion for weighted finite-state automata that expand when determinized with speech weights.

FIG. 9 further classifies the 18 lattices that expanded when determinized with speech weights. Again, the values on the x-axis indicate the open interval within which the expansion ratio falls when each lattice was determinized with its speech weights. As shown in FIG. 9, even for the 18 lattices that expanded with the speech weights, the vast majority (11) had only minor expansions.

Figure 10:
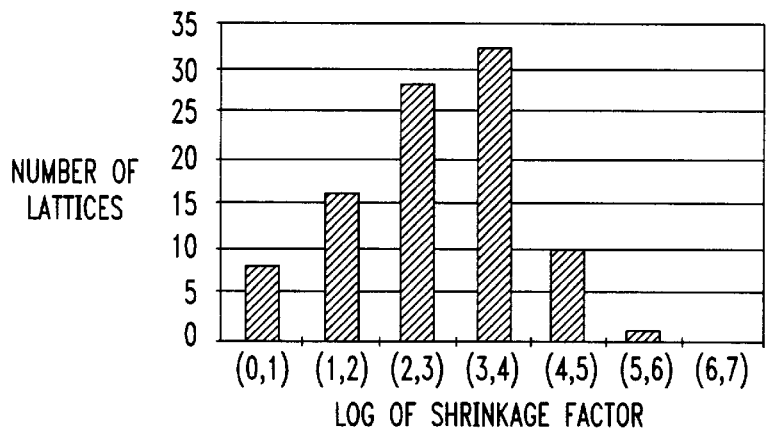
FIG. 10 is a histogram of the various orders magnitude of reduction for weighted finite-state automata that reduce when determinized with speech weights.

Since the utility of determinization in automatic speech recognition is the reduction in size achieved with actual speech weights, FIG. 10 indicates how much the 82 lattices that contracted when determinized shrank. For each of these lattices, the plotted value is:

$$\log(|G'|/|G|),$$

where:

|G| is the size of the undeterminized weighted finite-state automaton; and

|G'| is the size of the determinized weighted finite-state automaton. FIG. 10 shows the number of lattices whose corresponding values fell in various ranges.

Figure 11:
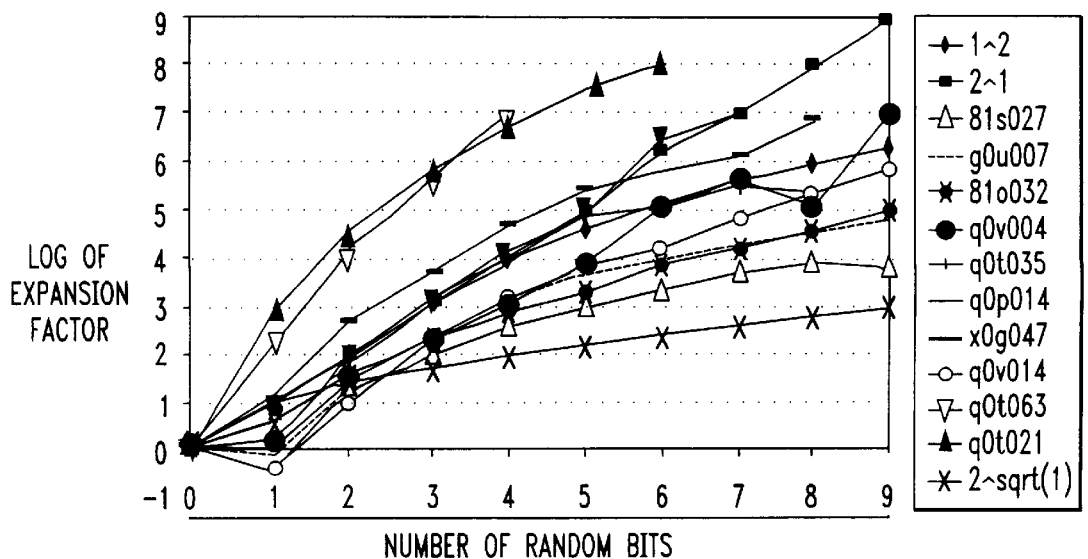
FIG. 11 is a graph relating the expansion factors for ten highly weight-dependent weighted finite-state automata versus the number of bits in the weights used.

Finally, FIG. 11 shows a relationship between the expansion ratio and the number of bits used in the random weights. The 10 lattices with the highest expansion value are shown in FIG. 11, which plots the logarithm $\log(|G'|/|G|)$ against the number of bits in the random weights. In addition, the functions $i^2$, $2^{sqrt(i)}$, $2^i$ are plotted in FIG. 11, where "i" is the number of bits. Most of the lattices exhibited some exponential growth as the number of bits increased, although some, like the lattice labeled "q0t063" increased by 128 times with 4 random bits.

The one lattice that could not be determinized with speech weights was slightly topology-dependent, in that the determinized zero-weighted variant had 2.7% more arcs than the original lattice. The remaining 99 lattices shrank when zero-weighted. Thus, if one of these lattices expanded, it did so solely due to weights rather than topology. FIG. 7 indicates that many of the lattices have some degree of weight dependence, since 63 expanded when sufficiently larger random weights were used. Furthermore, FIG. 11 suggests that random weights are a good way to estimate the degree to which a lattice is weight-dependent. In particular, FIG. 11 shows that the expansion factor is some super-linear, possibly exponential, function of the number of random bits. This suggests that using large random weights, for example, 32-bit weights, should cause expansion if anything will. The experiments on the minimized determinized lattices yielded results that are qualitatively the same, although fewer lattices still expand after a minimization. Hence, weight dependence appear to be a fundamental property of automatic speech recognition lattices, rather than an artifact of the particular determinization algorithm used.

A weighted finite-state automaton G represents the language L such that L=L(G). In this case, G is the specified or desired language. In particular, G can be one of the lattices in the automatic speech recognition cascade. G' is another weighted finite-state automaton and represents the language L' such that L'=L(G'). Two metrics determine how well L' approximates L, and thus how well G' approximates G. These metrics are the "k-recall" of L' with respect to L and the "k-precision" of L' with respect to L.

The k-recall metric measures the proportion of the strings in the first k equivalence classes of L that are preserved in the first k equivalence classes of L'. That is, the k-recall measures how many of the "good" strings the approximation L' represents. The k-precision metric measures the proportion of the strings in the first k equivalence classes of L' that come from the first k equivalence classes of L. That is, the k-precision metric measures how many of the strings in the approximation L' are "good." In other words, the k-recall metric measures what portion of the original best strings are kept in the first k-equivalent classes of the approximate language, while the k-precision metric measures how many spurious strings are introduced into the approximate language. The quality of the approximation L' rises with the k-recall and the k-precision metric. Recall and precision are standard concepts in information retrieval.

To determine the k-recall and the k-precision for the approximation language L', where L' is any weighted language, the members L' are partitioned by weight. Then $L'_k$ is the set of strings in the first k equivalence classes when L' is so ordered. Additionally, $[L']_j$ is the set of all strings of L' with no more than j symbols. Then, the k-recall metric of L' with respect to L is:

$$\lim_{j \to \infty} \frac{|[L_k \cap L'_k]_j|}{|[L_k]_j|}$$

Similarly, the k-precision metric of L' with respect to L is:

$$\lim_{j \to \infty} \frac{|[L_k \cap L'_k]_j|}{|[L'_k]_j|}$$

In particular, based on these definitions, G' is an approximate weighted finite-state automaton when it is used in place of G to represent some language L=L(G) represented by the weighted finite-state automaton G. The quality of the approximation can be measured by the k-recall and the k-precision metric of the L' with respect to L for increasing values of k. That is, an approximate weighted finite-state automaton substitutes one language, L', for another desired language, L. This is beneficial when representing the language L by the approximate weighted finite-state automaton G' is computationally superior to representing the language L by the weighted finite-state automaton G and where approximating the language L by the approximate language L' is sufficient for the particular application. In particular, in automatic speech recognition, an approximate weighted finite-state automaton would be preferable to a given weighted finite-state automaton when the approximate weighted finite-state automaton requires less memory or yields a faster recognition process without significant loss of accuracy.

Such approximate weighted finite-state automata can be used in all stages of the automatic speech recognition cascade. That is, the feature vector lattice 115, the acoustic model lattice 120, the phone lattice 135, the lexicon 140, the word lattice 155, and/or the grammar 160 and any composition of these lattices can be approximate weighted finite-state automata rather than weighted finite-state automata. In particular, the inventors have experimented with approximate weighted finite-state automata that represent composed lexicon lattices and grammar lattices, i.e., approximate weighted finite-state automata that represent the composition (D°M) shown in FIG. 2B. In particular, the inventors have experimented with approximate weighted finite-state automata representing this composition in the AT&T recognizer and have achieved favorable results. In particular, the inventors have achieved 20–25% model size reduction without a significant loss of accuracy.

Figure 12:
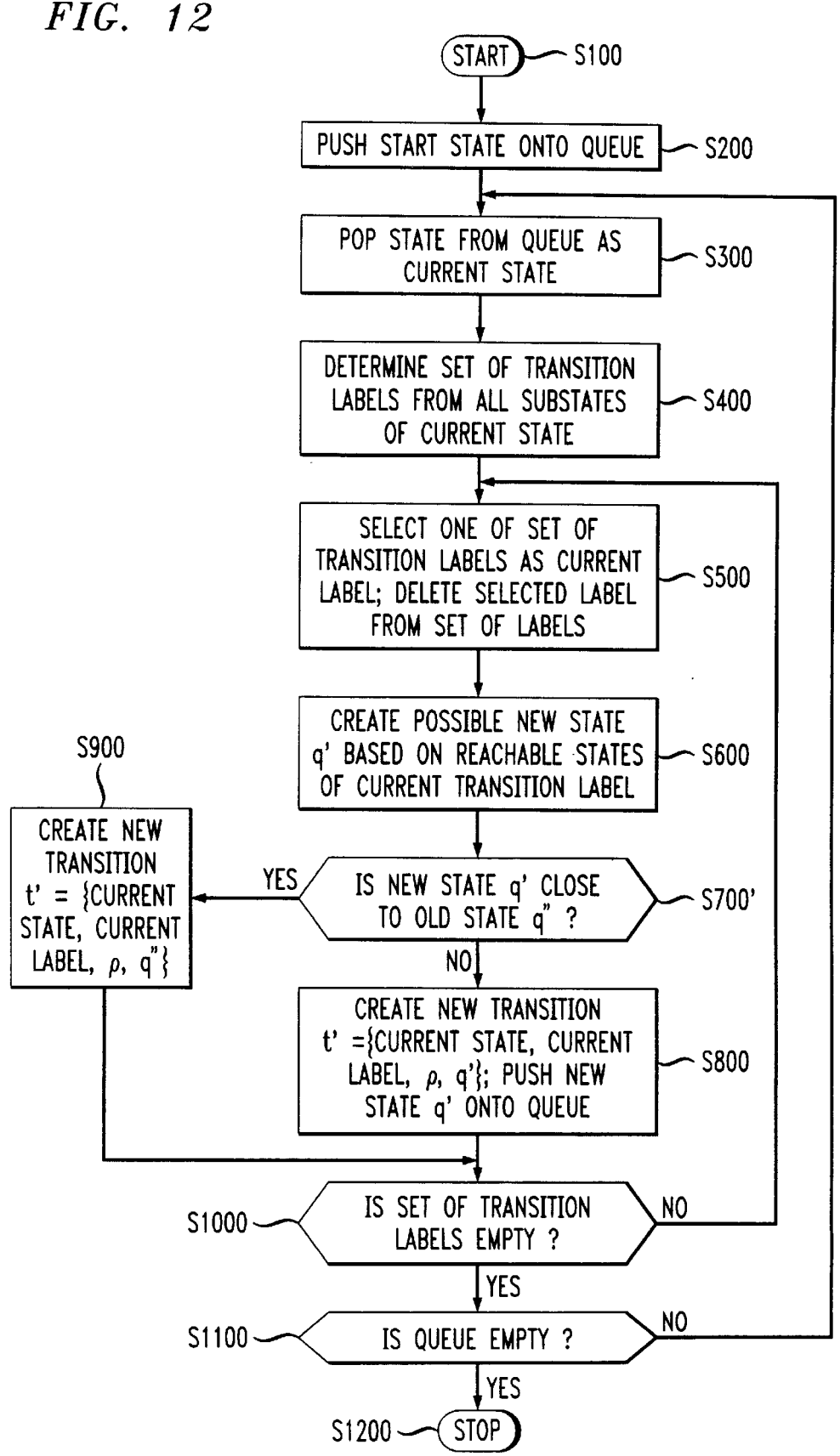
FIG. 12 is a flowchart outlining the process for generating an approximate weighted finite-state automaton from a weighted finite-state automaton.
Figure 13:
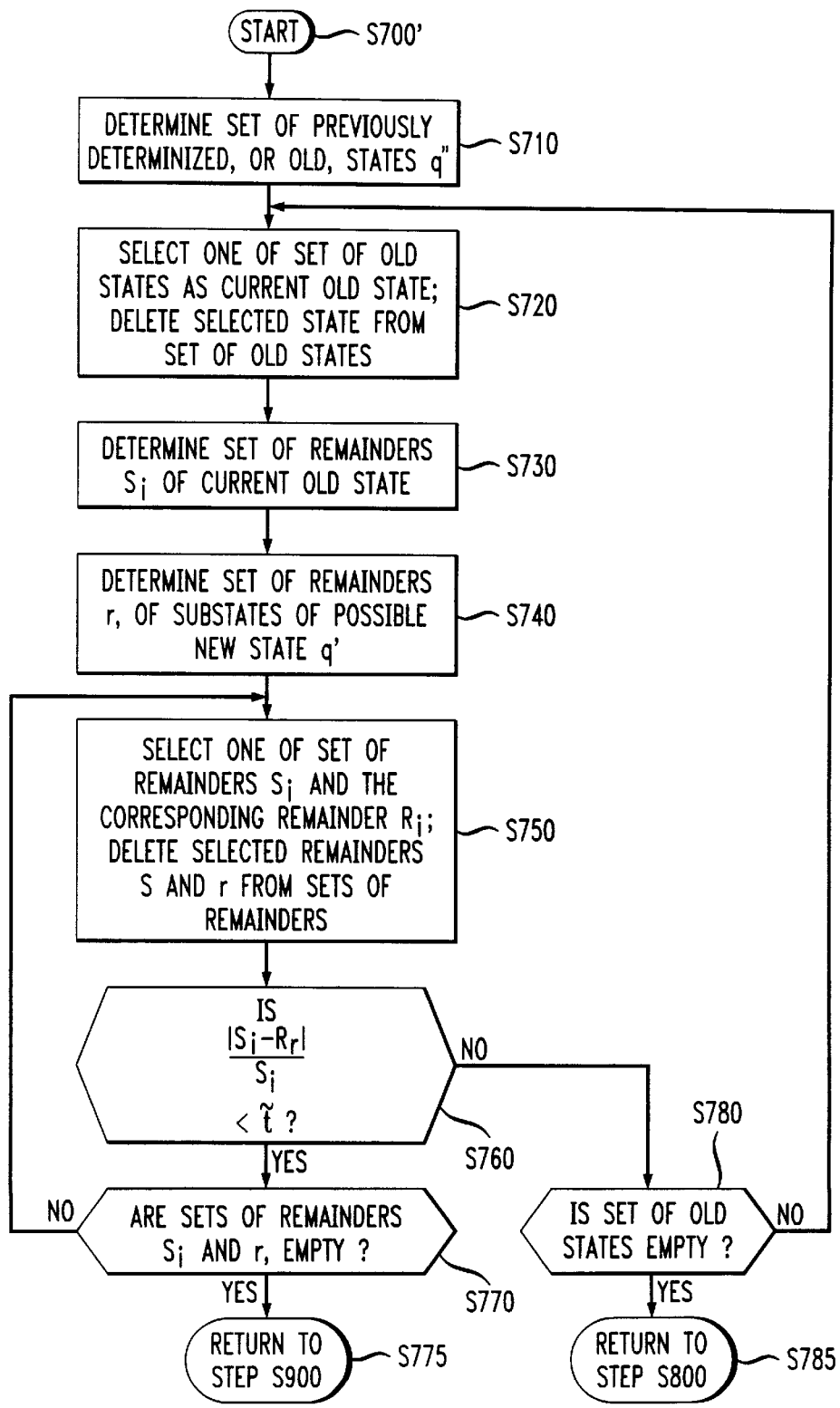
FIG. 13 is a flowchart outlining the process of determining whether a current state is sufficiently approximated by another state of FIG. 12.

FIGS. 12 and 13 outline one preferred method for constructing approximate weighted finite-state automata during the determinization process for determinizing a non-deterministic weighted finite-state automaton. In particular, as shown in FIG. 12, the general process for determinizing a non-deterministic weighted finite-state automaton to generate an approximate weighted finite-state automaton is identical to the determinization process outlined in FIG. 5, except that step S700 in FIG. 5 is replaced by S700' in FIG. 12. In particular, in step S700', the control routine determines whether the new state q' is close to some old state q", rather than determining whether the new state q' is identical or the same as some old state q". As shown FIG. 12, if the new state is sufficiently close to some old state, that old state is used rather than the new state. Otherwise, the new state q' is added to the approximate weighted finite-state automaton. That is, it is no longer necessary for the new state q' to be completely identical to some old state q" before that old state q" can be used in place of the new state q'.

FIG. 13 outlines the process for determining whether the new state q' is sufficiently close to some old state q" of step S700'. Starting in step S700', the control routine continues to step S710. In step S710, a set of a previously determinized, or old, states q" of the approximate weighted finite-state automaton is determined. Then, in step S720, one of the set of old states q" is selected as a current old state q". This current old state q" is then deleted from the set of old states q". Next, in step S730, a set of remainders $s_i$ of the current old state q" is determined. Similarly, in step S740, a set of remainders $r_i$ of the substates of the possible new state q' is determined. Control then continues to step S750.

In step S750, one remainder s is selected from the set of remainders $s_i$ of the current old state q". At the same time, the corresponding remainder r of the remainders $r_i$ of the substates of the new state q' is also selected. The selected remainders s and r are also deleted from the sets of remainders $s_i$ and $r_i$. Then, in step S760, the absolute value of the difference between the selected remainder s and the corresponding remainder r, divided by the selected remainder s is compared to a threshold τ. That is:

$$\frac{|s-r|}{s} \leq \tau.$$

If the absolute value of the difference of the remainders, |s-r|, divided by the corresponding remainder s of the old state q", is less than or equal to the threshold τ, these portions of the old and new sets are sufficiently close to each other. In this case, control continues to step S770. Otherwise, if the absolute value of difference between the remainder s, |s-r|, divided by the value of the remainder of the old state q" is greater than the threshold τ, these portions of the old and new states are not sufficiently close. In this case, control jumps to step S780.

In step S770, the control routine determines whether the sets of remainders $s_i$ and $r_i$ are empty. If not, control returns to steps S770 and new selected remainders s and r are selected. Otherwise, if all of the remainders $s_i$ and the corresponding remainders $r_i$ have been selected and each one generates a comparison value that is less than the threshold, the current old state q" is sufficiently close to the possible new state q'. Thus, control continues to step S775. In step S775, control is returned to step S900, where the transition t' for the current transition label from the current state is set to the current old state q".

In step S780, because at least one of the remainders s and the corresponding remainder r were not sufficiently close, the current old state q" cannot be used in place of the possible new state q'. Thus, in step S780, the control routine determines whether the set of old states q" is empty. If not, control returns to step S720, where another old state q" is selected as the current old state q" and the comparison process repeats. However, if the set of old states q" is empty, then no old state q" is sufficiently close to the possible new state q". In this case, control continues to step S785, which returns control to step S780. In step S780, the possible new state q' is added to the queue P and to the approximate weighted finite-state automaton with a transition on the current transition label from the current state to the new state q'.

Figure 14:
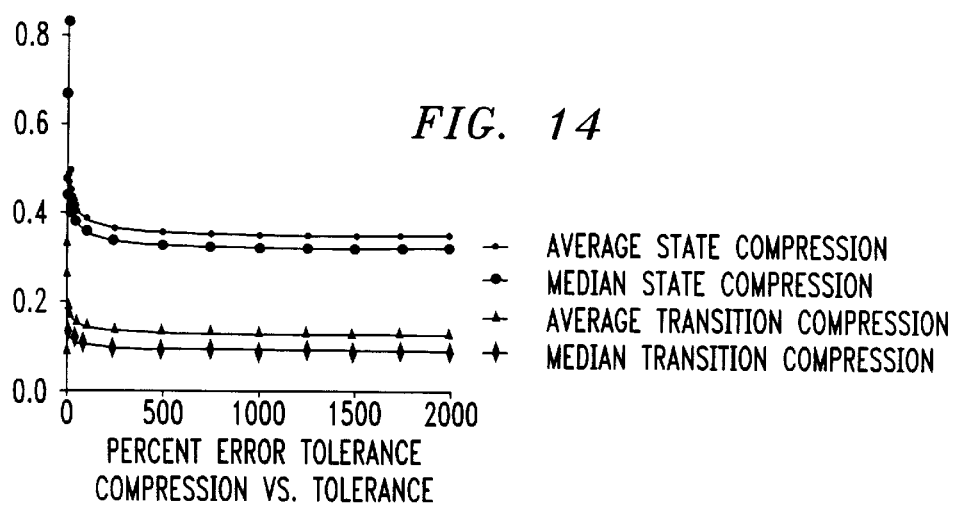
FIG. 14 is a graph outlining the relative sizes of approximate weighted finite-state automata relative to the corresponding weighted finite-state automata based on the size of the error tolerance parameter.
Figure 15:
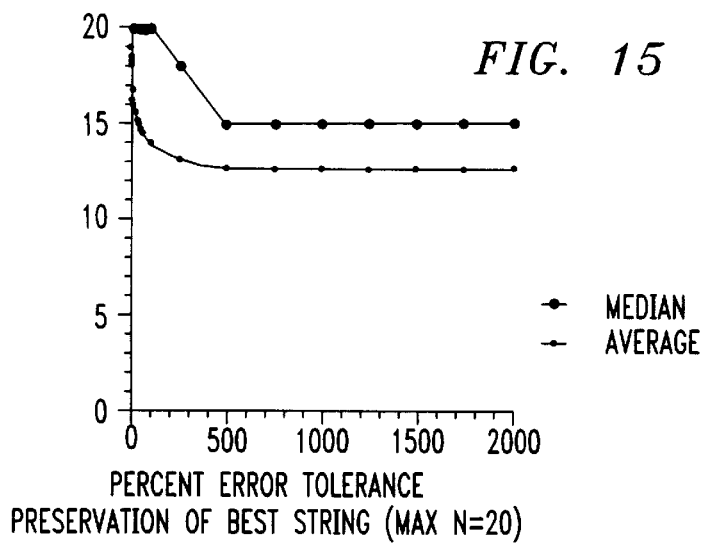
FIG. 15 is a graph showing the maximum string length for which the approximate weighted finite-state automata are identical to the corresponding strings in the corresponding weighted finite-state automata based on the error tolerance parameter.
Figure 16:
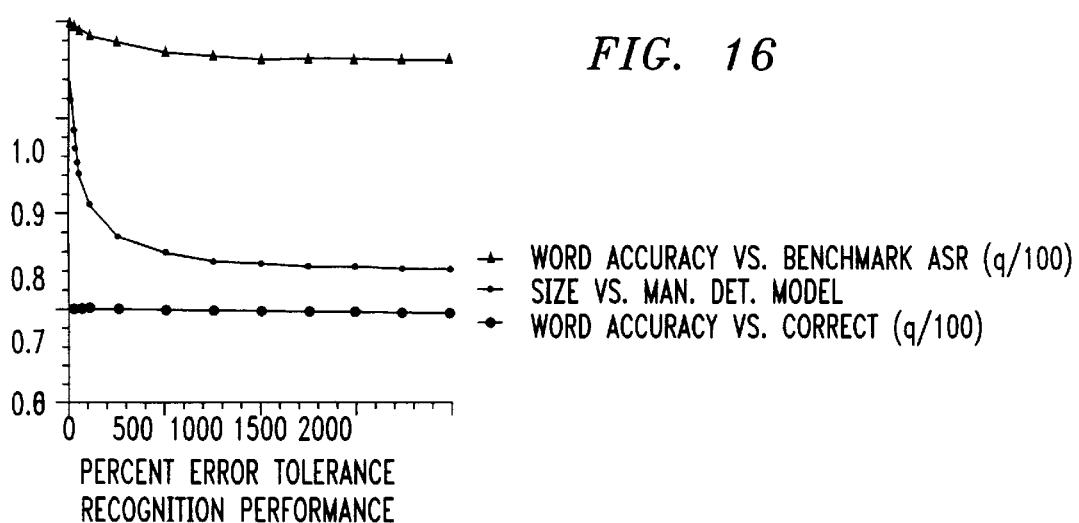
FIG. 16 is a graph showing the word accuracy of an approximate weighted finite-state automaton against the corresponding weighted finite-state automaton, the corresponding minimal deterministic weighted finite-state automaton and the correct output.

The method for generating an approximate weighted finite-state automaton performs well in practice, as shown in FIGS. 14–16. FIG. 14 shows the compression achieved by applying the method for generating an approximate weighted finite-state automaton outlined in FIGS. 12 and 13 to the 99 determinizable lattices discussed with respect to FIGS. 7–11 compared to the compression achieved by applying the determinization algorithm outlined in FIGS. 5 and 6 to these lattices. In FIG. 14, the x-axis indicates the different values for the error tolerance parameter, or threshold, τ, while the y-axis indicates the relative sizes of the lattices resulting from the approximate weighted method of FIGS. 12 and 13 versus the determinization method of FIGS. 5 and 6. As shown in FIG. 14, even small values of τ give compression factors better than 0.4 for states and better than 0.2 for transitions.

FIG. 15, meanwhile, shows that even using large values of τ does not affect the best paths through the lattices generated by the approximate weighted method and the determinization method. In particular, the y-axis of FIG. 15 indicates the maximum number of equivalence classes k where both the k-recall metric and the k-precision metric are equal to 1 for each equivalence class from 1 to k.

FIG. 16 shows the measure of word error accounting for insertions, deletions, and substitutions, of an approximate weighted finite-state automaton generated from the composition (D°M) against both the correct answer and that given by an automatic speech recognition system using a weighted finite-state automaton generated from the composition (D°M). The lexicon lattice D and the grammar lattice M were taken for the North American Business Task outlined above. Three hundred sentences were run using both the weighted finite-state automaton composition and the approximate weighted finite-state automaton composition.

In FIG. 16, the middle curve shows the relative size of the approximate weighted (D°M) lattice produced by the approximate weight method compared to the minimal deterministic weighted finite-state automaton. It should be appreciated that because the approximate weight method does not preserve the language, it can produce a model smaller than the minimal deterministic weighted finite-state automaton.

The bottom curve shows that the word accuracy does not degrade appreciably. While 69% word accuracy seems low, it is essentially the state of the art for near-real-time automatic speech recognition for the North American Business Task. It should also be appreciated that when the error tolerance parameter or threshold τ is set to 0, the approximate weighted finite-state automaton generated by the approximate weight method outlined in FIGS. 12 and 13 is identical to the determinized weighted finite-state automaton generated by the determinization method outlined in FIGS. 5 and 6.

The top curve of FIG. 16 shows that the output of the automatic speech recognition using the approximate weighted (D°M) lattice is nearly identical to the output of the automatic speech recognition using the weighted (D°M) lattice. Thus, the approximate (D°M) lattice does not just substitute one mistake for another.

The experimental evidence thus shows that the approximate weight method achieves considerable compression over the determinization method of FIGS. 5 and 6, yet preserves enough of the language to be effective. The experimental evidence also suggests that the approximate weight method is reasonable in practice. While the lexicon/grammar resulting from applying the approximate weight method is smaller than the lexicon/grammar resulting from the determinization method outlined in FIGS. 5 and 6, there is no affect on recognition time. In all likelihood, the approximate weight method compressed parts of the approximate weight (D°M) lattice that were not explored during recognition. In particular, the AT&T speech recognizer uses the Viterbi beam search, a heuristic that denies regions of the lattice to the search, trading accuracy for speed.

The 20–25% savings in required memory space achieved by the approximate weight method reduces the memory consumption by the speech recognizer, as well as the off-line model-building time. Furthermore, as bigger models are required, it is expected that the size reduction achieved by the approximate weight method will have a positive affect on caching and paging. Finally, of the 18 lattices that expanded under speech weights during the determinization method outlined in FIGS. 5 and 6, all of these lattices shrank when determinized with the approximate weight method.

Figure 17:
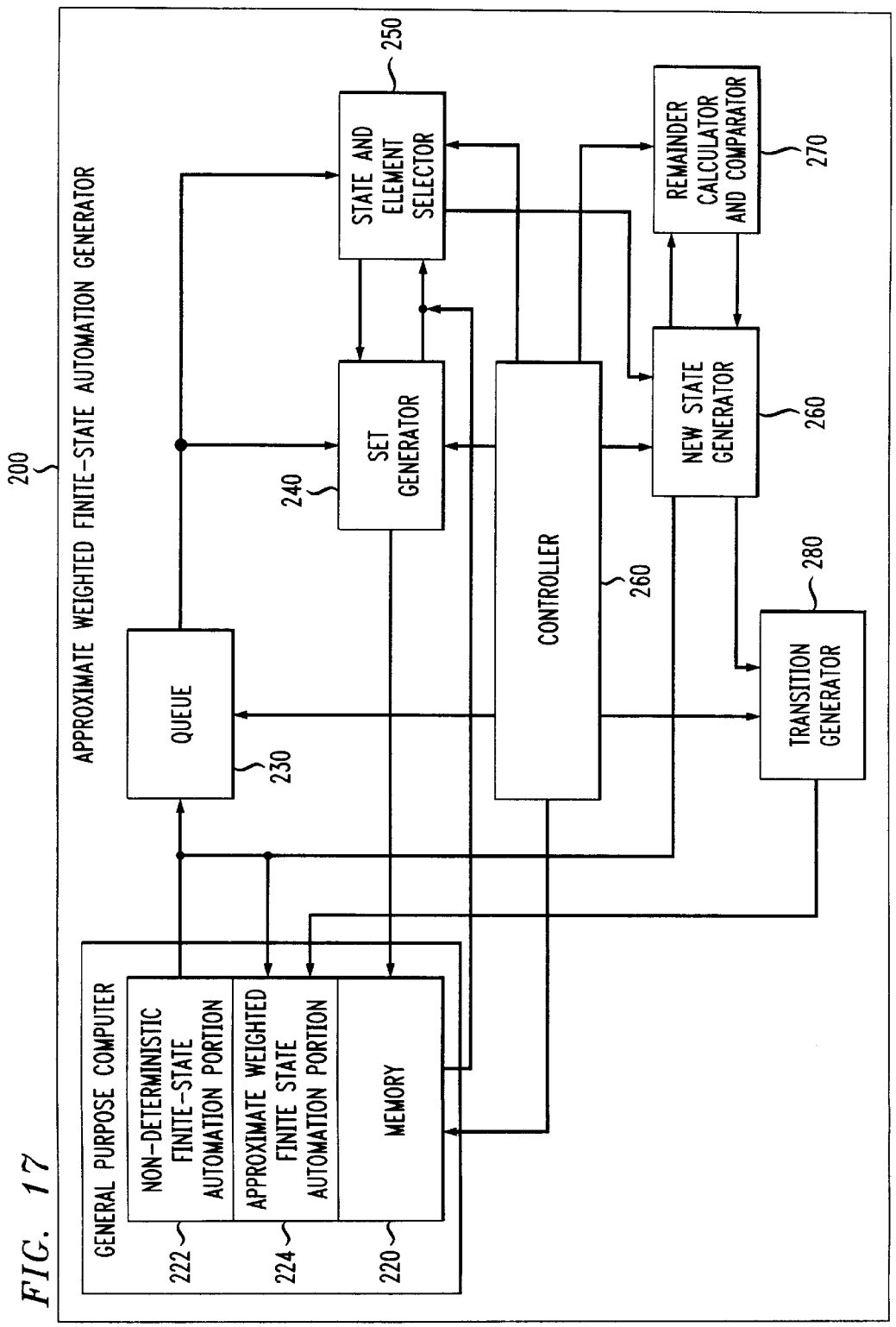
FIG. 17 is a block diagram of an automatic speech recognition using the approximate weighted finite-state automata of this invention.

FIG. 17 shows one embodiment of an approximate weighted finite-state automaton generator 200. In particular, the approximate weighted finite-state automaton generator 200 includes a controller 210 which controls all the following elements and a memory 220. In particular, the memory 220 has a non-deterministic finite-state automaton storage portion 222 and an approximate weighted finite-state automaton storage portion 224. The approximate weighted finite-state automaton generator 200 also includes a queue 230, which can be formed by a first-in, last-out memory device or can be formed as part of the memory 220. The approximate finite-state automaton generator additionally includes a set generator 240 which generates the sets outlined in FIGS. 5, 6, 12, and 13, an element selector 250 which selects elements from the sets as outlined in FIGS. 5, 6, 12, and 13, and a new state generator 260 which generates a new state according to the method outlined in the flowchart of FIG. 6.

It should also be appreciated that the approximate weighted finite-state automaton generator 200 is not limited to a first-in, last-out memory device. Rather, any queue discipline can be used to implement the queue 230. These queue disciplines include stacks, heaps., queues, first-in, first-out disciplines, least recently used disciplines, or any other known queue disciplines. Thus, the queue 230 could also be implement using a first-in, first-out memory, a register memory or any other known memory structure.

The approximate weighted finite-state automaton generator 200 further includes a remainder calculator and comparator 270, which determines the remainder value of step S760 and compares the remainder value to the desired threshold $\tau$. Finally, the approximate weighted finite-state automaton generator 200 includes a transition generator 280, which generates the new transitions outlined in steps S800 and S900 of FIG. 5. The new state generator 260 outputs the generated new states to the queue 230 and to the approximate weighted finite-state automaton storage section 224 for building the approximate weighted finite-state automaton. Similarly, the transition generator 280 outputs the generated transitions to the approximate weighted finite-state automaton storage portion 224 for building the approximate weighted finite-state automaton.

As shown in FIG. 17, the approximate weighted finite-state automaton generator 200 is preferably implemented on a programmed general purpose computer. However, the approximate weighted finite-state automaton generator 200 can also be implemented on a special purpose computer, a programmed microprocessor or microcontroller and peripheral integrated circuit elements, an ASIC or other integrated circuit, a hardwire electronic or logic circuit such as a discrete element circuit, a programmable logic device such as a PLD, a PLA, a FPGA, or a PAL, or the like. In general, any device in which finite-state machine capable of implementing the flowcharts shown in FIGS. 6, 12, and 13 can be used to implement the approximate weighted finite-state automaton generator 200.

As shown in FIG. 17, the memory 220 is preferably implemented using static or dynamic RAM. However, the memory 220 can also be implemented using a floppy disk and disk drive, a writeable optical disk and disk drive, a high drive, flash memory, or the like. Furthermore, it should be appreciated that only the approximate weighted finite-state automaton portion 224, and possibly the queue 230 need to be implemented using an alterable memory. That is, the non-deterministic finite-state automaton portion 222 of the memory 220 could be implemented using a non-alterable memory, such as a ROM, a PROM, an EPROM, an EEPROM, a CD-ROM and disk drive, or the like.

In particular, each of the set generator 240, the element selector 250, the new state generator 260, the remainder calculator, and comparator 270 and the transition generator 280 are implemented as programmed routines running on a general purpose or special purpose computer implemented using a microprocessor, a minicomputer, or a mainframe computer. One such software routine is outlined in FIG. 18.

As shown in FIG. 18, the software routine maintains a queue P of states to be processed. Initially, the queue P contains the start state $(\overline{q}, \overline{1})$ of the approximate weighted finite-state automaton A'. The while loop outlined in steps 7–30 remove states from the queue P. Furthermore, the while loop of step 7–30 constructs, for each such state q that is stored on the queue P, all the outgoing transitions using the for loop of steps 10–29. In the process, new states may be constructed and placed onto the queue P.

In particular, step 11 determines which states $q_r$ are reachable via a symbol "$\sigma$" from the substates encoded in the current state q. Steps 13–17 determine the approximate remainders corresponding to each state $q_r$. Step 18 forms a set $T_1$ of all states so far constructed for the approximate weighted finite-state automaton A' that contain state tuples identical to a possible new state q'. Then, step 20 forms a set $T_2$ of all states in $T_1$ such that the corresponding remainders to those in q' are within the error tolerance parameter $\tau$. If there is no such state, then q' is genuinely new. In this case, in steps 22–24, the genuinely new state q' is placed onto the queue P. In addition, the genuinely new step q' is marked final, if appropriate, and an appropriate $\sigma$-transition from q to q" is constructed. On the other hand, as shown in steps 26 and 27, if some state q" which is an element of the set $T_2$ exists, the $\sigma$-transition from q is constructed to q" instead of q'.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for automatically recognizing speech, comprising:

inputting an electric signal representing an uttered speech;

converting the electric signal to a feature vector lattice; and converting the feature vector lattice to a recognized text string representing the uttered speech using at least one approximate weighted finite-state lattice;

wherein each at least one approximate weighted finite-state lattice is generated from a corresponding non-deterministic weighted finite-state lattice by:

determining the corresponding non-deterministic weighted finite-state lattice to form the approximate weighted finite-state lattice on a state-by-state basis;

determining, as each set of states of the corresponding non-deterministic weighted finite-state lattice reachable from a current state of the approximate weighted finite-state lattice is determinized to form at least one proposed new state of the approximate weighted finite-state lattice, for each proposed new state, if that proposed new state is sufficiently similar to a previous state of the approximate weighted finite-state lattice;

creating a transition from the current state of the approximate weighted finite-state lattice to the previous state of the approximate weighted finite-state lattice if that proposed new state is sufficiently similar to the previous state; and creating a transition from the current state of the approximate weighted finite-state lattice to the proposed new state of the approximate weighted finite-state lattice if that proposed new state is not sufficiently similar to any previous state of the approximate weighted finite-state lattice.

2. The method of claim 1, wherein converting the feature vector lattice to a recognized text string comprises:

converting the feature vector lattice to a phone lattice using an acoustic model lattice;

converting the phone lattice to a word lattice using a lexicon lattice; and converting the word lattice to the recognized text string using a grammar lattice;

wherein at least one of the acoustic model lattice, the lexicon lattice and the grammar lattice is an approximate weighted finite-state lattice.

3. The method of claim 1, wherein converting the feature vector lattice to a recognized text string comprises:

converting the feature vector lattice to a phone lattice using an acoustic model lattice; and converting the phone lattice to the recognized text string using a composed lexicon and grammar lattice;

wherein at least one of the acoustic model lattice, and the composed lexicon and grammar lattice is an approximate weighted finite-state lattice.

4. The method of claim 1, wherein converting the feature vector lattice to a recognized text string comprises:

converting the feature vector lattice to a word lattice using a composed acoustic model and lexicon lattice; and converting the word lattice to the recognized text string using a grammar lattice;

wherein at least one of the composed acoustic model and lexicon lattice and the grammar lattice is an approximate weighted finite-state lattice.

5. The method of claim 1, wherein converting the feature vector lattice to a recognized text string comprises converting the feature vector lattice to the recognized text string using a composed acoustic model, lexicon and grammar lattice, wherein the composed acoustic model, lexicon and grammar lattice is an approximate weighted finite-state lattice.

6. The method of claim 1, wherein each at least one approximate weighted finite-state lattice corresponds to a non-deterministic weighted finite-state lattice and is an approximation of a deterministic weighted finite-state lattice generated from the corresponding non-deterministic weighted finite-state lattice.

7. An automatic speech recognition system, comprising:

a speech processing subsystem that inputs an electrical signal representing an uttered speech and outputs a feature vector lattice; and a speech recognizer that inputs the feature vector lattice and outputs a text string representing the uttered speech;

wherein the speech recognizer converts the feature vector lattice to the text string using at least one approximate weighted finite-state lattice;

means for determinizing, for each approximate weighted finite-state lattice, a corresponding non-deterministic weighted finite-state lattice on a state-by-state basis to form that approximate weighted finite-state lattice;

means for determining, as each set of states of the corresponding non-deterministic weighted finite-state lattice reachable from a current state of that approximate weighted finite-state lattice is determinized to form at least one proposed new state of that approximate weighted finite-state lattice, for each proposed new state, if that proposed new state is sufficiently similar to a previous state of that approximate weighted finite-state lattice;

means for creating a transition from the current state of that approximate weighted finite-state lattice to the previous state of that approximate weighted finite-state lattice if that proposed new state is sufficiently similar to the previous state; and means for creating a transition from the current state of that approximate weighted finite-state lattice to the proposed new state of that approximate weighted finite-state lattice if that proposed new state is not sufficiently similar to any previous state of that approximate weighted finite-state lattice.

8. The automatic speech recognition system of claim 7, wherein the speech recognizer comprises:

a phonetic recognition subsystem than converts the feature vector lattice to a phone lattice using an acoustic model lattice;

a word recognition subsystem that converts the phone lattice to a word lattice using a lexicon lattice; and a text recognition subsystem that converts the word lattice to the recognized text string using a grammar lattice;

wherein at least one of the acoustic model lattice, the lexicon lattice and the grammar lattice is an approximate weighted finite-state lattice.

9. The automatic speech recognition system of claim 7, wherein the speech recognizer comprises:

a phonetic recognition subsystem than converts the feature vector lattice to a phone lattice using an acoustic model lattice; and a word and text recognition subsystem that converts the phone lattice to the recognized text string using a composed lexicon and grammar lattice;

wherein at least one of the acoustic model lattice, and the composed lexicon and grammar lattice is an approximate weighted finite-state lattice.

10. The automatic speech recognition system of claim 7, wherein the speech recognizer comprises:

a phonetic and word recognition subsystem than converts the feature vector lattice to a word lattice using a composed acoustic model and lexicon lattice; and a text recognition subsystem that converts the word lattice to the recognized text string using a grammar lattice;

wherein at least one of the composed acoustic model and lexicon lattice and the grammar lattice is an approximate weighted finite-state lattice.

11. The automatic speech recognition system of claim 7, wherein the speech recognizer comprises a phonetic, word and task recognition subsystem that converts the feature vector lattice to a recognized text string using a composed acoustic model, lexicon and grammar lattice, wherein the composed acoustic model, lexicon and grammar lattice is an approximate weighted finite-state lattice.

12. The automatic speech recognition system of claim 7, wherein each at least one approximate weighted finite-state lattice corresponds to a non-deterministic weighted finite-state lattice and is an approximation of a deterministic weighted finite-state lattice generated from the corresponding non-deterministic weighted finite-state lattice.

* * * * *